(12) United States Patent
Carter et al.

(10) Patent No.: US 9,758,002 B2
(45) Date of Patent: Sep. 12, 2017

(54) SUMMIT DIAGONAL MATRIX FOR TIRE MANUFACTURE

(75) Inventors: James Thomas Carter, Simpsonville, SC (US); M'Hamed Louzri, Taylors, SC (US)

(73) Assignees: Compagnie Generale des Etablissements Michelin, Clermont Ferrand (FR); Michelin Recherche et Technique S.A., Granges-Paccot (CH)

( * ) Notice: Subject to any disclaimer, the term of this patent is extended or adjusted under 35 U.S.C. 154(b) by 336 days.

(21) Appl. No.: 14/296,017

(22) PCT Filed: Dec. 14, 2011

(86) PCT No.: PCT/US2011/064822
§ 371 (c)(1),
(2), (4) Date: Jun. 4, 2014

(87) PCT Pub. No.: WO2013/089696
PCT Pub. Date: Jun. 20, 2013

(65) Prior Publication Data
US 2015/0115499 A1    Apr. 30, 2015

(51) Int. Cl.
*B29D 30/08* (2006.01)
*B60C 99/00* (2006.01)
*B29D 30/58* (2006.01)
*B29C 47/00* (2006.01)
*B29C 47/12* (2006.01)
*B29L 30/00* (2006.01)

(52) U.S. Cl.
CPC ........ *B60C 99/006* (2013.01); *B29C 47/0019* (2013.01); *B29C 47/128* (2013.01); *B29D 30/08* (2013.01); *B29D 30/58* (2013.01); *B29L 2030/002* (2013.01); *B29L 2030/007* (2013.01)

(58) Field of Classification Search
CPC ............ B29C 47/0004; B29C 47/0019; B29C 47/003; B29C 47/0035; B29C 47/0033; B29C 2030/086; B29D 30/08–30/34
See application file for complete search history.

(56) References Cited

U.S. PATENT DOCUMENTS

| 2,272,231 A | 2/1942 | Voth |
| 3,218,209 A | 11/1965 | Travers et al. |
| 3,591,439 A * | 7/1971 | Leblond ................. B29D 30/26 156/396 |
| 3,919,020 A | 11/1975 | Floto |

(Continued)

OTHER PUBLICATIONS

Glover, Thomas. Pocket Ref. Littleton, CO, Sequoia Publishing, 2003. pp. 24-25, 32-33, 160-161, 614-615, 620-621, 644-645.*

(Continued)

*Primary Examiner* — Erin Snelting
(74) *Attorney, Agent, or Firm* — Dority & Manning, P.C.

(57) ABSTRACT

A standardization system for the manufacture of tires is provided. The same size tire components can be used in the summit of tires having different sizes i.e., tires having different section widths, sidewall heights, and/or aspect ratios. A matrix of tire sizes can be associated with one or more tire summit parameters. The matrix can be used for the manufacture of tires having one or more standardized components by holding substantially constant the value of one or more tire summit parameters across a diagonal of the matrix.

19 Claims, 3 Drawing Sheets

(56) References Cited

U.S. PATENT DOCUMENTS

| | | | |
|---|---|---|---|
| 3,961,657 A | | 6/1976 | Chrobak |
| 3,986,267 A | * | 10/1976 | Taylor .................. G01B 5/0025 |
| | | | 33/203.16 |
| 5,204,036 A | * | 4/1993 | MacMillan ........ B29D 30/0606 |
| | | | 156/95 |
| 5,711,829 A | | 1/1998 | Pollard et al. |
| 6,426,482 B1 | * | 7/2002 | Fike .................. B29D 30/0606 |
| | | | 219/121.72 |
| 6,514,447 B1 | | 2/2003 | Mori et al. |
| 6,979,378 B2 | * | 12/2005 | Okada .................... B29D 30/00 |
| | | | 156/111 |
| 2001/0020507 A1 | | 9/2001 | Pereira et al. |
| 2005/0000625 A1 | | 1/2005 | Mancini et al. |
| 2009/0183812 A1 | | 7/2009 | Hoffmann et al. |
| 2013/0037195 A1 | * | 2/2013 | Weaver .................. B29D 30/50 |
| | | | 152/541 |
| 2014/0261938 A1 | * | 9/2014 | Colby .................... B29D 30/56 |
| | | | 152/209.25 |

OTHER PUBLICATIONS

Extended European Search Report, referencing MUB14-2307EP, dated Dec. 16, 2015, 8 pages.

PCT International Search Report for PCT/US2011/064822, dated Apr. 19, 2012.

Boeger, Slow Riders—now even slower: Which Tire Size Fits My Rim; Blog (online); Aug. 29, 2011.

* cited by examiner

TABLE 1

$w_i$

| $r_i$ | 175 | 185 | 195 | 205 | 215 | 225 | 235 | 245 | 255 | 265 | 275 | 285 | 295 |
|---|---|---|---|---|---|---|---|---|---|---|---|---|---|
| 0.4 | | | | 90.0 | 94.0 | | 102.0 | 108.0 | 112.0 | 116.0 | 120.0 | 124.0 | 128.0 |
| 0.45 | | | | 90.0 | 94.0 | 98.0 | 102.0 | 108.0 | 112.0 | 116.0 | 120.0 | 124.0 | 128.0 |
| 0.5 | | | 82.0 | 86.0 | 90.0 | 94.0 | 98.0 | 102.0 | 108.0 | 112.0 | 116.0 | 120.0 | 124.0 |
| 0.55 | | | 82.0 | 86.0 | 90.0 | 94.0 | 98.0 | 102.0 | 108.0 | 112.0 | 116.0 | 120.0 | 124.0 |
| 0.6 | 70.0 | 74.0 | 78.0 | 82.0 | 86.0 | 90.0 | 94.0 | 98.0 | 102.0 | 108.0 | 112.0 | 116.0 | 120.0 |
| 0.65 | 70.0 | 74.0 | 78.0 | 82.0 | 86.0 | 90.0 | 94.0 | 98.0 | 102.0 | 108.0 | 112.0 | 116.0 | 120.0 |
| 0.7 | 66.0 | 70.0 | 74.0 | 78.0 | 82.0 | 86.0 | 90.0 | 94.0 | 98.0 | 102.0 | 108.0 | 112.0 | 116.0 |
| 0.75 | | 70.0 | 74.0 | 78.0 | 82.0 | 86.0 | 90.0 | 94.0 | 98.0 | 102.0 | 108.0 | 112.0 | 116.0 |
| 0.8 | | | 70.0 | | 78.0 | 82.0 | 86.0 | 90.0 | 94.0 | 98.0 | 102.0 | 108.0 | 112.0 |

FIG. 3

SUMMIT DIAGONAL MATRIX FOR TIRE MANUFACTURE

FIELD OF THE INVENTION

The subject matter of the present disclosure relates to a standardization system for the manufacture of tires.

BACKGROUND OF THE INVENTION

Whether for passenger or commercial vehicles, tires are manufactured in a wide variety of sizes and shapes. Part of the variation is due to differences in the wheel rims provided as original equipment on vehicles as well as the wide variety of after-market rims also available. These rims can vary in e.g., both width and diameter. Additionally, even for a given rim, consumers may use different tire sizes for the same rim size. For commercial vehicles, differences in load requirements can require different rim and tire sizes.

These differences in size and shape present a very significant challenge for a tire manufacturer. Tire construction is complex and includes multiple components, many of which are not visible from the outside of the tire. For example, one or more layers of material may extend from bead to bead through the side walls and summit or crown region of the tire. One or more belts may be placed under the tread region. The bead region alone may include multiple different rubber components proximate to the bead core.

As a result, the production of a single tire size requires a manufacturer to have the capacity to produce and/or inventory a wide variety of tire components. Moreover, the production of multiple tire sizes over a range of sizes and shapes can be particularly difficult because many of these tire components may not be readily interchangeable between different tire sizes. For example, the carcass ply that is used to manufacture a low profile passenger tire likely cannot be used for a non-low profile tire because e.g., of differences in dimensions. The belt packages used in e.g., a tire size of 235/75R15 versus a tire of size 205/70R14 may not be interchangeable for similar reasons. In other words, many of the components used in tires of different sizes and dimensions are not standardized—i.e. constructed in a manner that allows the same component to be used across tires of different sizes. Of course, the costs associated with the labor, equipment, and inventory of multiple different tire components to accommodate production of a range of tire sizes is substantial and generally increases the costs of training the production personnel as well.

Accordingly, a system that facilitates tire manufacture would be beneficial. More particularly, a system that can be used to standardize one or more tire components so that the same components can be used to manufacture multiple different tires sizes would be useful. Stated differently, tires of different sizes and shapes that can be manufactured using one or more components having the same size or dimension for each such tire would be particularly beneficial.

SUMMARY OF THE INVENTION

Aspects and advantages of the invention will be set forth in part in the following description, or may be obvious from the description, or may be learned through practice of the invention.

In one exemplary aspect, the present invention provides a method of tire manufacture. The method includes the steps of creating a matrix of tire sizes using tire dimensions along the axes of the matrix; associating a tire summit parameter with corresponding pairs of the tire dimensions; standardizing the tire summit parameter along a diagonal of the matrix by making the tire summit parameter along such diagonal substantially constant; and, manufacturing tires using the matrix.

In another exemplary aspect, the present invention provides another method for the manufactures of tires. The method includes the steps of producing tires with different aspect ratios and different sidewall heights that all have substantially the same tire summit width ($sw_i$). The producing step includes referencing a matrix having either tire sidewall height ($h_i$) or tire section width ($w_i$) along a first axis and tire aspect ratio ($r_i$) along a second axis, and having a tire summit width ($sw_i$) associated with each particular sidewall height ($h_i$) or tire section width ($w_i$) along the first axis and tire aspect ratio ($r_i$) along the second axis, and wherein the tire summit width ($sw_i$) remains substantially the same for a predetermined change in the value of the first axis and the second axis.

In one exemplary embodiment, the present invention provides a tire production system. The system includes a plurality of tires having a range of different aspect ratios and different section widths. The plurality of tires includes at least one tire having a larger section width and a larger aspect ratio than another tire, wherein the plurality of tires each have at least one common tire summit parameter.

The method includes the steps of creating a matrix of tire sidewall heights ($h_i$) along one dimension and tire aspect ratios ($r_i$) along another dimension; associating a tire summit width ($w_i$) with corresponding pairs of tire sidewall height ($h_i$) and tire aspect ratio ($r_i$); standardizing the tire summit width ($w_i$) along a diagonal of the matrix by making the tire summit widths along such diagonal substantially constant; and manufacturing tires using the matrix.

In another exemplary aspect, the present invention provides a method for the manufacturing of tires. The method includes the steps of producing tires with different aspect ratios and different sidewall heights that all have substantially the same tire summit width ($w_i$). The producing step includes referencing a matrix having tire sidewall height ($h_i$) along one dimension and tire aspect ratio ($r_i$) along another dimension, and having a tire summit width ($w_i$) associated with each particular sidewall height ($h_i$) and tire aspect ratio ($r_i$), and wherein the tire summit width remains substantially the same for a predetermined change in tire sidewall height ($h_i$) and tire aspect ratio ($r_i$).

In one exemplary embodiment, the present invention also provides a system of tires manufactured with a standardization. The system includes a matrix constructed of tire sidewall heights ($h_i$) along one dimension and tire aspect ratios ($r_i$) along another dimension, the matrix also having a plurality of tire summit widths ($w_i$), one for each corresponding sidewall height ($h_i$) and tire aspect ratio ($r_i$), and wherein the tire summit widths ($w_i$) are substantially the same for predetermined changes in the tire sidewall height ($h_i$) and the tire aspect ratio ($r_i$); and, a plurality of tires of having different sidewall heights and different aspect ratios, wherein the tires have substantially the same tire summit width as a tire summit width ($w_i$) of the matrix.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figure(s), in which:

FIG. 3 provides a table as further described herein.

DETAILED DESCRIPTION OF THE INVENTION

Figure 1:
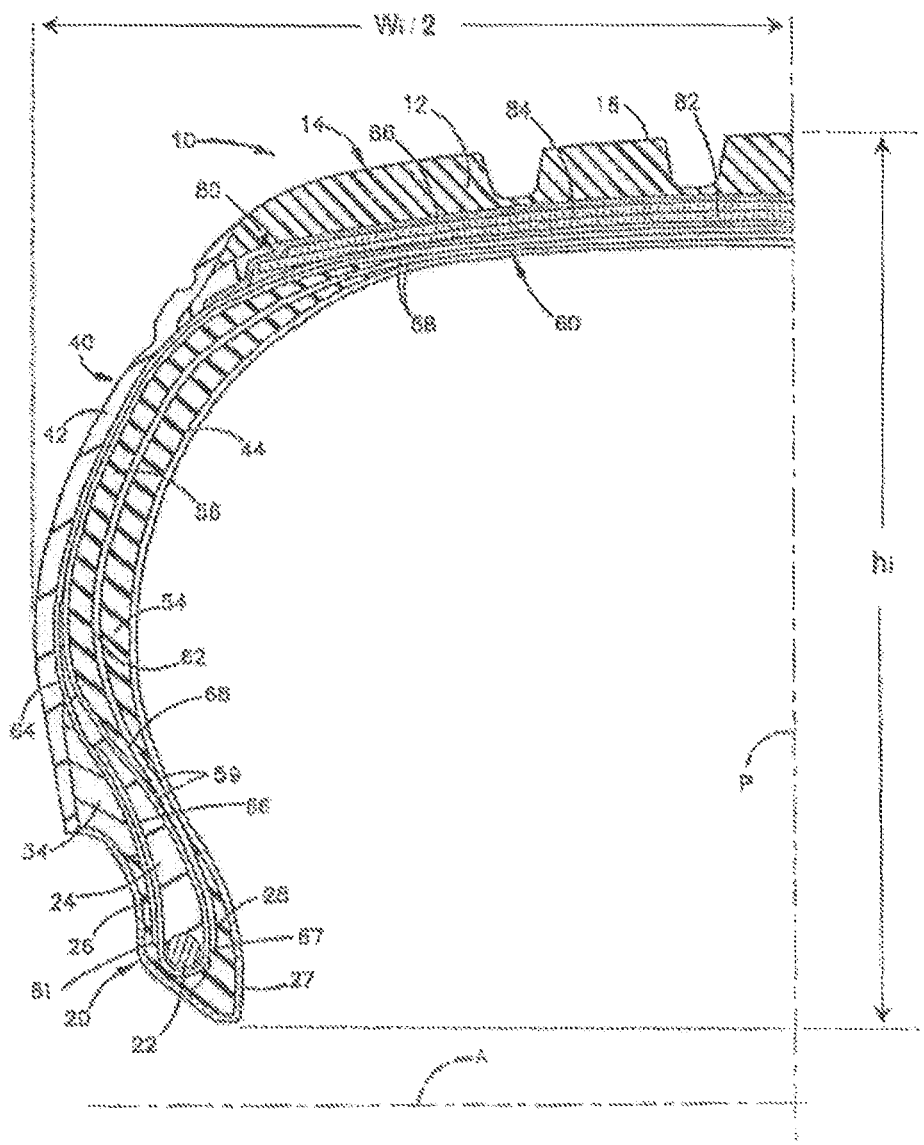
FIG. 1 provides a cross-section view of a portion of an exemplary tire as may be used with the present invention.

The present invention provides a standardization system for the manufacture of tires. The same tire components, particularly components for the summit, can be used for tires of different sizes i.e., tires having different sidewall heights, section widths, and/or aspect ratios. For example, a matrix can be created of tire dimensions such as e.g., tire aspect ratios versus either tire sidewall heights or tire section widths. Each pair of values in the matrix is associated with a tire summit parameter such as e.g., the width of one or more components in the tire summit. Following along a diagonal of the matrix, one or more tire components in the summit can be kept at a constant dimension such that the same size component can be used for the manufacture of tires having different dimensions or sizes.

For purposes of describing the invention, reference now will be made in detail to embodiments and/or methods of the invention, one or more examples of which are illustrated in or with the drawing(s). Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

The following terms are defined as follows for this disclosure:

"Tire sidewall height" is the linear distance between where the bead of the tire would contact the wheel rim and the top of the tread.

"Tire section width" or "section width" is defined as the linear distance along the axial direction of the tire measured at the widest point of the tire—i.e. from the widest point on the outer sidewall to the widest point on the inner side wall.

"Axial direction" or the letter "A" in the figures refers to a direction parallel to the axis of rotation of the tire.

"Radial direction" or the letter "R" in the figures refers to a direction that is orthogonal to the axial direction and extends in the same direction as any radius that extends orthogonally from the axial direction.

"Summit," "tire summit," or "summit region" refers to that portion of the tire between the sidewalls and radially outside of the carcass of the tire. The summit, therefore, includes e.g., the tread portion of the tire and belts located between the tread portion and the carcass that do not extend into the sidewalls and towards the beads. The summit is also sometimes referred to as the crown of the tire.

"Tire summit parameter" refers to a dimension of a tire component that is in the summit of the tire and includes, for example, tire section width, tread width, belt width, rolling tread width, cross-sectional area of a belt or tread portion, and/or the volume of a belt or tread portion per pitch (a unit of material along the circumferential direction of the tire).

"Tire aspect ratio" or "Aspect ratio" is the ratio of the tire sidewall height to the tire section width.

FIG. 1 provides a cross-section view of one-half of an exemplary hybrid tire 10 as may be used with the present invention and capable of running in a pneumatic and non-pneumatic mode. Tire 10 is provided only by way of example and for purposes of identifying some of the components that can be standardized using the present invention. It should be understood, however, that the present invention may be used with pneumatic tires and non-pneumatic tires as well. Additionally, the present invention may be used with a variety of tire types including e.g., passenger, light truck, commercial, aviation, construction, and others.

Tire 10 has a cross-sectional configuration in a radial plane that includes axial direction A as illustrated in FIG. 1. This figure shows half the cross-section which is symmetrical about the mid-circumferential plane P. A tire having this cross-sectional configuration is readily mounted on a rim of a vehicle.

A pair of bead portions 20 are axially spaced apart and each include a bead core 22, a bead filler 24, a rubber support portion 34, a first rubber seat portion 26, a second rubber toe portion 28 and a rim seat ply 27. A carcass portion 60 has a middle carcass layer 62, an outer carcass layer 64 and an inner carcass layer 68. The middle carcass layer 62 has a turned-up portion 66 which extends around the bead core 22 from inside to outside of the tire 10. The inner carcass layer 68 is positioned uniformly between the middle carcass layer 62 and the innerliner portion 44 in each bead portion 20 and extends radially inward to at least a point 67 axially inward and adjacent to the bead core 22. The outer carcass layer 64 of the tire is located axially outside the middle carcass layer 68 and the turned-up portion 66 and extends radially inward to at least a point 61 axially outward and adjacent to the bead core 22. The bead filler 24 contacts the outermost surface of the bead core 22 and extends a distance radially outward. The bead filler 24 is contoured to assume a predetermined optimum profile.

A load bearing sidewall portion 40 extends from a belt package 80 of the tire to the bead portion 20 at both axial edges of a crown or tread portion 14. Each sidewall portion 40 includes a pair of crescent-shaped rubber reinforcing members 54, 56 as shown in FIG. 1. The first crescent-shaped reinforcing member 56 is disposed between the middle carcass layer 62 and the inner carcass layer 68. The second crescent-shaped member 54 is disposed between the inner carcass layer 68 and an innerliner portion 44 of the tire 10. The sidewall portions 40 help maintain the crown portion 14 radially separated from the bead portion 20 when the tire has a loss of inflation pressure. A radially outer member 42 is positioned radially outward of outer carcass layer 54. A tread portion 12 has a surface 16 for contacting a ground surface during running of the tire.

A belt package 80 is located radially outward of the carcass layers 62, 64 and 68 in the summit or crown portion 14 of the tire 10. For this example, the belt package has a wide inner belt 82 and at least one narrower outer belt 84. A cap ply 86 having a width to axially extend beyond both lateral edges of the innermost belt 82, is included as part of the preferred belt package 80.

Tire 10 has a section height $h_i$ and section width $w_i$ as shown in FIG. 1. The ratio of the section height $h_i$ to the section width $w_i$ is the aspect ratio $r_i$ of tire 10. The present invention may be used with tires having a range of section widths $w_i$, section heights $h_i$, aspect ratios $r_i$, and is not limited to what is shown in FIG. 1.

Figure 2:
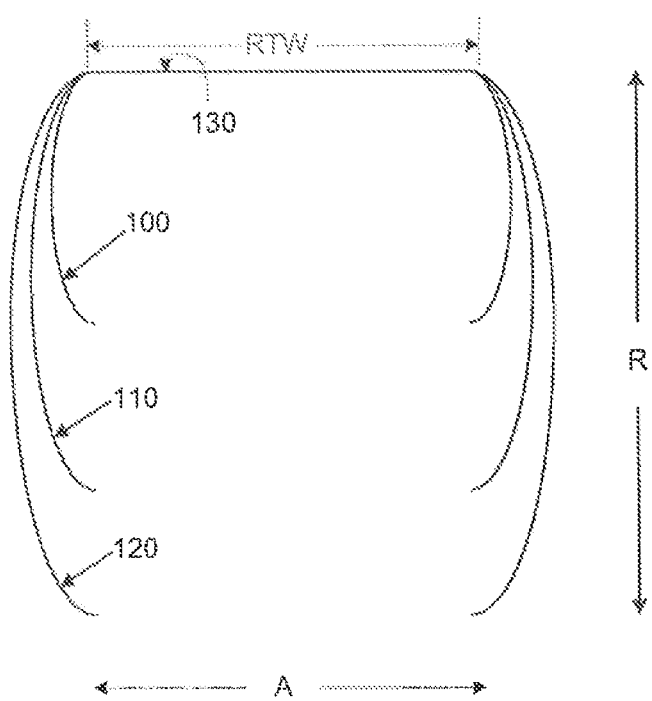
FIG. 2 provides a schematic representation of tires of various sizes superimposed on each other.

FIG. 2 provides a schematic representation of the outside surface of three tires superimposed upon each other with one or more dimensions exaggerated for descriptive purposes. Tire 100, for example, has a size of 225/45—or a section width of 225 mm and an aspect ratio of 0.45. Tire 110 has a size of 235/55—or a section width of 235 mm and an aspect ratio of 0.55. Finally, tire 120 has a size of 245/65—or a section width of 245 mm and an aspect ratio of 0.65.

The tires shown in FIG. 2 have been standardized according to the present invention. Accordingly, components in the summits of these tires can be standardized for use in each tire because they have at least one tire summit parameter in common such as e.g., the width along the axial direction can be substantially the same, the thickness along the radial direction can be substantially the same, and/or the cross-sectional area or volume per pitch could be substantially the same. It should be noted that the similarity of the tread portion of these tires exists regardless of the radius of the rim or wheel onto which the tire is mounted.

include the use of mold matrices such as described in e.g., U.S. Pat. Nos. 6,426,482 and 5,204,036.

Similarly, belts (such as e.g., belts 82 and 84 in tire 10) that are located in the summit or crown may also be standardized when the rolling tread width of each tire 100, 110, and 120 is the same and when the axial width of the tire throughout that portion of the summit below the tread surface 130 is nearly identical between the different tire sizes 100, 110, and 120. As a result, belts having the same axial width can be used in each tire. This standardization greatly simplifies the manufacturing process because only one belt width for a given belt in the summit need be manufactured or stored. The belt can be cut to length as desired for different tire sidewall heights or section widths. Where more than one belt is used in the summit, a standardized belt package can be provided for use in all three tires rather than suffering the expense associated with the production of three different belt packages—one for each tire 100, 110, and 120.

The standardization of the summit components can be accomplished by establishing a relationship between one or more tire summit parameters and tire size. For purposes of describing the invention, the width of components in the summit to changes in the aspect ratio and tire size from tire to tire will be used as an example. Other tire summit parameters could be used as well.

Accordingly, an example of a matrix of the present invention is shown in Table I.

TABLE I

| | | $w_i$ | | | | | | | | | | | | |
|---|---|---|---|---|---|---|---|---|---|---|---|---|---|---|
| | | 175 | 185 | 195 | 205 | 215 | 225 | 235 | 245 | 255 | 265 | 275 | 285 | 295 |
| $r_i$ | 0.4 | | | | 90.0 | 94.0 | | 102.0 | 108.0 | 112.0 | 116.0 | 120.0 | 124.0 | 128.0 |
| | 0.45 | | | | 90.0 | 94.0 | 98.0 | 102.0 | 108.0 | 112.0 | 116.0 | 120.0 | 124.0 | 128.0 |
| | 0.5 | | | 82.0 | 86.0 | 90.0 | 94.0 | 98.0 | 102.0 | 108.0 | 112.0 | 116.0 | 120.0 | 124.0 |
| | 0.55 | | | 82.0 | 86.0 | 90.0 | 94.0 | 98.0 | 102.0 | 108.0 | 112.0 | 116.0 | 120.0 | 124.0 |
| | 0.6 | 70.0 | 74.0 | 78.0 | 82.0 | 86.0 | 90.0 | 94.0 | 98.0 | 102.0 | 108.0 | 112.0 | 116.0 | 120.0 |
| | 0.65 | 70.0 | 74.0 | 78.0 | 82.0 | 86.0 | 90.0 | 94.0 | 98.0 | 102.0 | 108.0 | 112.0 | 116.0 | 120.0 |
| | 0.7 | 66.0 | 70.0 | 74.0 | 78.0 | 82.0 | 86.0 | 90.0 | 94.0 | 98.0 | 102.0 | 108.0 | 112.0 | 116.0 |
| | 0.75 | | 70.0 | 74.0 | 78.0 | 82.0 | 86.0 | 90.0 | 94.0 | 98.0 | 102.0 | 108.0 | 112.0 | 116.0 |
| | 0.8 | | | 70.0 | | 78.0 | 82.0 | 86.0 | 90.0 | 94.0 | 98.0 | 102.0 | 108.0 | 112.0 |

For example, the rolling tread width, RTW, on each tire may have the same width along axial direction A from tire to tire. As a result, tread portions (such as e.g., tread portion 12 of tire 10) having the same axial width can often be used on any of tires 100, 110, and 120. Typically, the tread portion is extruded through a die that is then positioned on other components during the creation of a green tire on a tire forming drum. In cases where the axial width and/or thickness of the tread portion for tires 100, 110, and 120 is substantially the same, the same die may be used to extrude each tread portion. Similarly, when these dimensions are slightly different but the cross-sectional area is substantially the same, the same die may be used to extrude the various tread portions.

The manufacturer can therefore avoid the expense of maintaining separate extrusion dies and associated machinery for each tire size as well as related labor for changing the dies. Differences in the lengths of the tread portion can be readily accommodated by cutting the tread portion to the appropriate length as it is extruded. Additionally, molds that are used to form tread features into the tread portion during the curing process can also be standardized or used commonly across the different tires since e.g., the width of the tread portion remains the same. This standardization may Along a first axis of the matrix (in this example, the columns of Table I) tire section widths, $w_i$, are provided in increments of 10 mm. Table I begins with a tire section width of 175 mm and increases to 295 mm in increments of 10 mm with each value representing one column of the matrix. The choice of starting the matrix at 175 mm and increasing with increments of 10 mm is arbitrary and other values may be used as well.

Along a second axis of the matrix (in the example, the rows of Table I), tire aspect ratios, $r_i$, are provided in increments of 0.05. For example, Table I begins with a tire aspect ratio of 0.4 and ends with a tire aspect ratio of 0.8. Again, the choice of starting the matrix at 0.4 and increasing with increments of 0.05 is arbitrary and other values may also be used.

It should also be understood that while section widths $w_i$ are used for one axis of the matrix versus the aspect ratio $r_i$ for the other axis, tire sidewall heights $h_i$ could be employed for an axis instead of tire section widths $w_i$ because tire sidewall heights $h_i$ are readily calculated from the corresponding aspect ratio $r_i$. Similarly, tire section width $w_i$ could be used along one axis and tire sidewall height $h_i$ could be used along another axis. Also, using the teaching disclosed herein, it will be understood that the choice of whether to place e.g., the aspect ratio $r_i$ along the first axis (vertical) or second axis (horizontal) is arbitrary and the present invention is not limited to the particular matrix shown in the tables herein. The matrix of the present invention can be used in a tangible, table format as shown herein but could also be created by an algorithm and/or exist in an electronic format. In addition, other dimensions related to the tire size could be used for the axes as well.

Next, a tire summit parameter such as e.g., tire summit width $sw_i$ is associated with each corresponding pair of tire dimensions along the axes of the matrix. Returning to Table I, for example, a tire summit width $sw_i$ can be associated with each corresponding pair of section widths $w_i$ and aspect ratios $r_i$. The dimension along the axial direction of the tire that is selected for the tire summit width $sw_i$ can be selected from any of the various components located in the summit of the tire. For example, the tire summit width $sw_i$ used in the matrix could be e.g., the rolling tread width (the width of the rolling tread along the axial direction of the tire) or some constant percentage thereof. The tire summit width $sw_i$ could be the width along the axial direction of a particular belt (such as e.g., belts 82 or 84 of tire 10 in FIG. 1) located in the tire summit of a particular tire model, or some constant percentage thereof. By way of additional example, the tire summit width $sw_i$ could be the width of the tread portion (such as e.g., tread portion 12 of tire 10) of the tire. Also, as stated above, the tire summit parameter used in standardization could be the tread portion cross-sectional area or the tread volume that is required to make a pitch of the tread along the circumferential direction of the tire. Other tire summit parameters may be used as well.

Accordingly, for the example matrix in Table I, the tire summit width $sw_i$ that is associated with corresponding pairs of tire section width $w_i$ and tire aspect ratio $r_i$ is one half of the width of a belt located in the summit. For example, in Table I, the tire summit width associated with a tire section width 235 and a tire aspect ratio of 0.4 is 204 min (i.e. 2×102 mm).

In order to provide for a standardization of tire components over the different tire sizes, a tire summit parameter such as e.g., the tire summit width $sw_i$ along certain diagonals of the matrix is held substantially constant across changes in tire section width $w_i$ and tire aspect ratio $r_i$. Returning to the matrix, Table I is repeated again as FIG. 3 with lines drawn to delineate some of the diagonals where the tire summit width $sw_i$ is maintained substantially constant.

For example, the following set of tire sizes can all be manufactured using a belt width of 188 mm (i.e. 2×94 mm): 215/40, 215/45, 225/50, 225/55, 235/60, 235/65, 245/70, 245/75, and 255/80. Other diagonals also reveal multiple tire sizes that can all be manufactured using a belt in the tire summit that has the same width along the axial direction from tire to tire. For Table I, the diagonals along which the tire summit width $sw_i$ is constant have slope of an increase of about 10 mm for each increase of about 0.05 in tire aspect ratio.

Accordingly, the matrix set forth in Table I can be used to provide standardization in the manufacture of tires. Rather than e.g., creating belts for nearly every corresponding pair of tire sidewall height $h_i$ and tire aspect ratio $r_i$, a manufacturer can use the matrix to identify a belt width that will be the same for a given set of tire sizes and aspect ratios along a diagonal of the matrix. Not only can one belt in the summit of the tire be standardized, but all belts in the summit could be standardized. More particularly, a belt package common to a set for tire sidewall heights and ratios along a diagonal of the matrix can be applied. The same standardization can also be used for tread belts applied to the tires across a diagonal of the matrix. Thus, the matrix can be used to reduce the variation in components that the manufacturer must create and use in the manufacture of tires.

Additionally, as will be understood by one of skill in the art using the teachings disclosed herein, the standardization of various components in the summit of the tire also allows manufacturing machinery and/or components thereof to be standardized. For example, the number of dies required for the extrusion of the tread portions of the tires can be reduced because the same die size can be used to extrude a tread portion having the same axial width for a set of tires across the diagonal of the matrix. Similarly, the same size die can be used even when the axial width is different if the cross-sectional area of the extruded summit component is the same. By way of further example, U.S. Pat. Nos. 3,268,950 and 3,426,116 discuss the use of adjustable extrusion dies to accommodate different tires sizes. The present invention, however, allows the use of one die for various tire sizes such that an adjustable die could be avoided.

Similarly, the portion of a mold in e.g., a tire press that contacts the tread to provide features therein can also be standardized across tires of different sizes and aspect ratios. For example, U.S. Pat. Nos. 6,426,482 and 5,204,036 describe adjustment of mold components around the surface of a tire mold by increasing or decreasing the number of molding elements to accommodate changes e.g., in tire size. The present invention simplifies this process by indicating e.g., that these adjustments should occur along the diagonal of a matrix such as that shown in Table I.

The simplification of dies and the molding process are provided by way of example only. The standardization of other parts of the manufacturing process may also be undertaken with the present invention as well.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of tire manufacture, comprising the steps of:

creating a matrix of tire sizes using tire dimensions along the axes of the matrix;

associating a tire summit parameter with corresponding pairs of the tire dimensions from both axes of the matrix;

standardizing the tire summit parameter along a diagonal of the matrix by selecting a substantially constant value for the tire summit parameter along the diagonal;

producing components for incorporation within multiples summits of multiple tires, the tires having different aspect ratios but each of the tires having the same substantially constant value of the tire summit parameter;

and manufacturing tires having different aspect ratios using the components from the step of producing.

2. A method of tire manufacture as in claim 1, said manufacturing step comprises:

creating tires having different sidewall heights that incorporate tread belts having the same width along an axial direction of the tire.

3. A method of tire manufacture as in claim 1, wherein said manufacturing step comprises:
producing tires having different sidewall heights that incorporate one or more belts under a tread in the summit of the tires that have the same width along an axial direction of the tires.

4. A method of tire manufacture as in claim 1, wherein said manufacturing step comprises:
extruding tread belts having the same width along an axial direction for incorporation into tires having different sidewall heights.

5. A method of tire manufacture as in claim 1, wherein said standardizing step comprises designing multiple tires having different sizes that each use a component in the summit having the same width along an axial direction of the tire.

6. A method of tire manufacture as in claim 1, wherein said standardizing step comprises designing multiple tires having different sizes that each include a belt in a summit region of the tire that has the same width along an axial direction of the tire.

7. A method of tire manufacture as in claim 1, wherein said standardizing step comprises designing multiple tires having different sizes that each include a tread portion for the tire that has the same cross-sectional area.

8. A method of tire manufacture as in claim 1, wherein the matrix is comprised of tire section width ($w_i$) along one axis and tire aspect ratio ($r_i$) along the other axis, wherein the tire summit parameter along the diagonal of the matrix is a tire summit width $sw_i$, and wherein the diagonal has a slope such that an increase of about 10 mm in section width ($w_i$) corresponds to an increase in aspect ratio ($r_i$) of about 0.05 along the diagonal.

9. A method of tire manufacture as in claim 1, wherein said manufacturing step comprises:
providing a rubber extrusion die for the manufacture of tires having different sidewall heights and aspect ratios.

10. A method of tire manufacture as in claim 1, wherein the tire summit parameter of said step of associating is a rolling tread width of the tire.

11. A method of tire manufacture as in claim 1, wherein the tire summit parameter is selected from the group consisting of tire section width, tread width, belt width, rolling tread width, cross-sectional area of a belt within each of the summits of the tires, volume of a belt per pitch within each of the summits of the tires, and volume of a tread portion per pitch within each of the summits of the tires.

12. A method of tire manufacture as in claim 11, wherein the pair of tire dimensions are selected from the group consisting of section width, sidewall height, and aspect ratio.

13. A method of tire manufacture as in claim 12, further comprising storing one or more components from the producing step prior to the manufacturing step.

14. A method for the manufacturing of tires, comprising the steps of:
producing tires with different aspect ratios and different sidewall heights that all have substantially the same tire summit width ($sw_i$), said producing step comprising
referencing a matrix having either tire sidewall height ($h_i$) or tire section width ($w_i$) along a first axis and tire aspect ratio ($r_i$) along a second axis, and having a tire summit width ($sw_i$) associated with each particular sidewall height ($h_i$) or tire section width ($w_i$) along the first axis and tire aspect ratio ($r_i$) along the second axis, and wherein the tire summit width ($sw_i$) remains substantially the same for a predetermined change in the value of the first axis and the second axis.

15. A method for the manufacturing of tires as in claim 14, wherein said step of producing further comprises using tread portions in the tires that are of the same width along an axial direction of the tires.

16. A method for the manufacturing of tires as in claim 14, wherein said step of producing further comprises using belt packages having the same width along an axial direction of the tires.

17. A method for the manufacturing of tires as in claim 14, wherein said step of producing step further comprises extruding tread portions for the tires using an extrusion die that is the same for each of the tread portions.

18. A method for the manufacturing of tires as in claim 14, wherein the tire summit width ($sw_i$) of the matrix remains substantially the same across a change of about 10 mm in tire sidewall height ($h_i$) and a change of about 0.05 in tire aspect ratio ($r_i$).

19. A method for the manufacturing of tires as in claim 14, wherein said step of producing further comprises using a tread mold to produce tread for the tires having different aspect ratios and different side wall heights.

* * * * *